J. G. WELDON.

Hot-Air Furnace.

No. 6,294. Reissued Feb. 16, 1875.

Witnesses

J. R. Connolly

R. H. Whittlesey

By

Inventor

James G. Weldon

Connolly Bros & M. Tighe

Attorneys

UNITED STATES PATENT OFFICE.

JAMES G. WELDON, OF PITTSBURG, PENNSYLVANIA.

IMPROVEMENT IN HOT-AIR FURNACES.

Specification forming part of Letters Patent No. 119,955, dated October 17, 1871; reissue No. 6,294, dated February 16, 1875; application filed November 30, 1874.

*To all whom it may concern:*

Be it known that I, JAMES G. WELDON, of Pittsburg, in the county of Allegheny and State of Pennsylvania, have invented certain new and useful Improvements in Hot-Air Apparatus; and I do hereby declare that the following is a full, clear, and exact description thereof, that will enable others skilled in the art to which it appertains to make and use the same, reference being had to the accompanying drawings, and to the letters of reference marked thereon, which form a part of this specification.

This invention relates to an improvement in that class of hot-air apparatus used for the artificial warming of buildings, wherein a current of air is made to pass through a series of tortuous flues or passage-ways, generally stacked together, over and around a furnace, in such a manner as to heat the air by contact on its way through them to the rooms or chambers to be heated.

My invention consists in the means I employ for generating steam, and introducing it into the air-passages around the outside of the furnace, so that all the ingoing currents of air shall absorb it, and thereby become adequately tempered, and, to a great degree, recompensed for the loss of natural moisture, and by which the original vitality of the atmosphere is maintained, consequently better fitted for respiration, and adapted to comfort.

Figure 1:
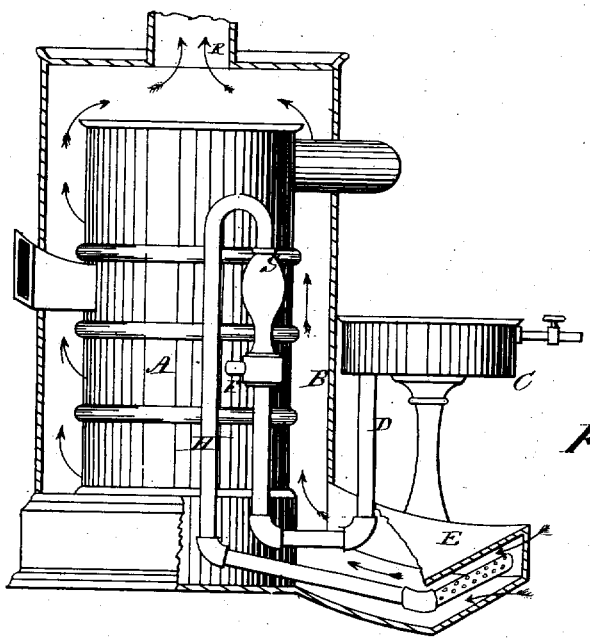
Figure 2:
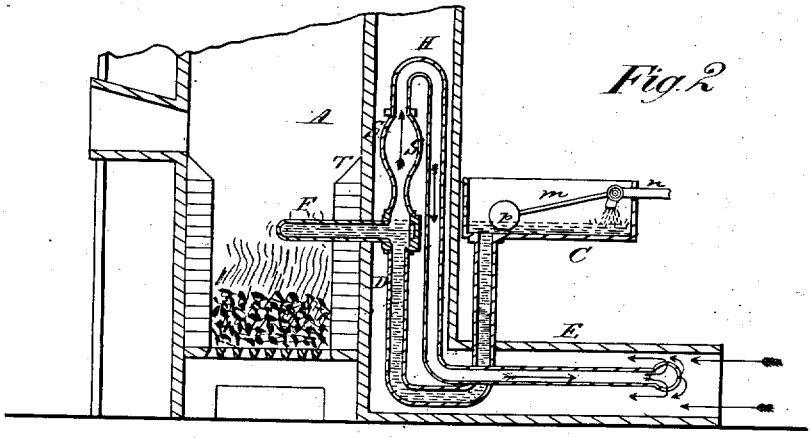

In the accompanying drawings, Figure 1 represents a side elevation of a hot-air apparatus, partly perspective and partly in section, with my steam generating and supplying contrivance attached. Fig. 2 is a view of the lower portion of a heating apparatus, showing all my improvements in vertical transverse section.

For the purpose of my invention, I construct a hot-air furnace, with its air-flues, passage-ways, and air-heating spaces, in any of the forms in use, and with all the usual appliances and appendages incident to such apparatus; but in addition I place on the outside of the furnace A and its casing B a small tank, C, provided with an automatic arrangement for regulating to it a supply of water, which arrangement consists in attaching to the cock of the feed-pipe *n* one end of a lever, *m*, and to its other end a float, *p*, which rises and falls as the supply increases or diminishes, and by this means opens or closes the feed-pipe, as the case may require. To the bottom of this tank C I connect a pipe, D, which may pass downward into the air-inlet E, then up inside the casing B, or it may pass down, and take a turn upward, outside the casing, and then unites in either case with the hollow arm F, which extends through the walls of the furnace A, and projects a short distance into the fire-pot, so as to be acted upon by direct heat. Above this hollow arm F, and connected thereto by interior communication, is arranged a steam drum or chamber, S, from the top of which extends a pipe, H, that is turned downward to the air inlet or passage, either in a direct vertical line and horizontal continuation, or by a line directly to or near the mouth of the air-inlet, where it terminates in an open end, as shown in the figure.

This apparatus, constructed as described, is intended to be placed in a cellar or lower apartment of the building to be warmed, and flues leading to the various parts of the building are supplied with the heated air through the outlets R.

Such is the construction and relative position of parts that on a supply of water being let into the tank C it will flow down the bent tube D, and from thence into the hollow arm F, so as to nearly fill it, when, on fire being kindled in the furnace A, steam will soon be generated in the hollow arm, and will pass up into the chamber S, and thence, by the pipe H, to its open end, and will there escape through the openings therein, into the air-duct E, where, by mingling with the inflowing current of outside air, it hydrates the whole body of air to be heated, and it will be carried upward and around the heating-surface of the furnace, adding a moderate, agreeable, and healthful quantity of moisture, such as can be produced in no other way; for unless the inflowing current be hydrated all at once, some portions will not receive any moisture.

I am aware that the employment in connection with a hot-air furnace of a steam-generator, from which steam may be injected into the hot-air space surrounding the furnace, for the purpose of hydrating the air, is not, broadly, new in this case.

The peculiar and novel feature of my invention consists in the construction and arrangement of an apparatus which will generate steam and conduct it downward to the air-inlet of air-heating space, and allow the steam to escape at a point and with such volume as will insure the moistening of the whole body of incoming air to be heated and transmitted, the devices heretofore used being capable of only partially hydrating the air, and therefore of little or no practical utility.

Having fully described my invention, what I claim in Letters Patent is—

The method of generating steam and introducing it into the air-passages of an air-heating apparatus, by passing the water for the production of such steam into a hollow arm, F, so extending through the walls of the furnace and into the fire-box, as to be acted upon by direct heat, and conveying the steam so generated, by means of suitable pipes H, into the air-passages E, leading to and around the outside of said furnace, in the manner shown and set forth.

2. The combination, with a hot-air furnace having a steam-generator, of an eduction-pipe leading downward from said generator, and having open communication with the air-inlet of the air-heating chamber, substantially as shown and described, so as to moisten the whole body of incoming air.

In testimony that I claim the foregoing I have hereunto set my hand this 17th day of November, 1874.

JAMES G. WELDON.

Witnesses:

P. B. REILLY,

T. J. MCTIGHE.